US010046782B2

(12) United States Patent
Dechant

(10) Patent No.: US 10,046,782 B2
(45) Date of Patent: Aug. 14, 2018

(54) CONVERTIBLE CART ASSEMBLY

(71) Applicant: OXCART PRODUCTS, LLC, Wichita, KS (US)

(72) Inventor: Todd Francis Dechant, Wichita, KS (US)

(73) Assignee: OXCART PRODUCTS, LLC, Wichita, KS (US)

( * ) Notice: Subject to any disclaimer, the term of this patent is extended or adjusted under 35 U.S.C. 154(b) by 151 days.

(21) Appl. No.: 15/260,476

(22) Filed: Sep. 9, 2016

(65) Prior Publication Data
US 2017/0072976 A1    Mar. 16, 2017

Related U.S. Application Data

(60) Provisional application No. 62/216,892, filed on Sep. 10, 2015.

(51) Int. Cl.
*B62B 1/20* (2006.01)
*B62B 1/24* (2006.01)
(Continued)

(52) U.S. Cl.
CPC ............... *B62B 1/20* (2013.01); *B60P 1/24* (2013.01); *B60P 1/283* (2013.01); *B62B 1/24* (2013.01);
(Continued)

(58) Field of Classification Search
CPC ..... B62B 1/18; B62B 1/20; B62B 1/24; B60P 1/28; B60P 1/283; B60P 1/24; B60P 1/16; B60P 1/165
(Continued)

(56) References Cited

U.S. PATENT DOCUMENTS 4,052,079 A * 10/1977 Lehman .................... B62B 1/26
                                                                        280/47.2
5,031,926 A *  7/1991 Wannamaker ............ B62B 1/20
                                                                        280/47.2
(Continued)

*Primary Examiner* — Hilary L Gutman
(74) *Attorney, Agent, or Firm* — Hovey Williams LLP

(57) ABSTRACT

A dump cart includes a frame; a pair of wheels rotatably coupled to the frame by at least one axle; a bed frame pivotally coupled to the frame so that the bed frame may be pivoted relative to the frame between a lowered, hauling position and a raised, dumping position; a bed attached to the bed frame for receiving and hauling objects; a removable tow bar having a first end that may be attached to the frame and a second end that may be attached to a towing vehicle so that the towing vehicle may pull the dump cart; and a wheelbarrow attachment accessory that may replace the removable tow bar to convert the dump cart to a wheelbarrow. The wheelbarrow attachment accessory includes a draw bar; a mounting bracket attached to a first end of the draw bar that may be removably attached to the frame; a pair of handles attached to a second end of the draw bar that may be gripped by a user to move and maneuver the wheelbarrow; and at least one leg depending from the draw bar for supporting the draw bar and handles above the ground. The dump cart may also include a lift assist mechanism coupled between the frame and the bed frame for biasing the bed frame toward its raised, dumping position so as to assist a user in dumping objects from the wheelbarrow.

20 Claims, 9 Drawing Sheets

(51) Int. Cl.
*B62B 5/00* (2006.01)
*B62B 5/06* (2006.01)
*B60P 1/24* (2006.01)
*B60P 1/28* (2006.01)

(52) U.S. Cl.
CPC .............. *B62B 5/0079* (2013.01); *B62B 5/06* (2013.01); *B62B 2206/006* (2013.01)

(58) Field of Classification Search
USPC .............................. 298/17 T; 280/47.31, 292
See application file for complete search history.

(56) References Cited

U.S. PATENT DOCUMENTS

| | | | | |
|---|---|---|---|---|
| 6,508,478 B1 * | 1/2003 | Ortez | ........................ | B62B 1/20 280/47.31 |
| 6,851,701 B2 * | 2/2005 | Tomchak | ................ | B62B 1/208 280/47.33 |
| 6,880,852 B2 * | 4/2005 | Lim | .......................... | B62B 1/20 16/426 |
| 6,886,838 B1 * | 5/2005 | Zimmerman | ............. | B62B 1/22 280/47.31 |
| 7,134,681 B1 * | 11/2006 | Jones | ....................... | B60D 1/00 280/651 |
| 8,382,138 B2 * | 2/2013 | Carroll | ..................... | B62B 1/20 280/288.4 |
| 8,857,826 B2 * | 10/2014 | Frenkel | .................... | B62B 5/00 280/47.32 |
| 8,985,619 B2 * | 3/2015 | Celli | ....................... | B62B 1/002 280/47.31 |
| 8,998,341 B2 * | 4/2015 | Dechant | ................... | B60P 1/16 298/5 |
| 9,004,607 B1 * | 4/2015 | Martini | ..................... | B60P 1/24 298/5 |
| 9,067,610 B2 * | 6/2015 | Lichtenberg | .......... | B62B 5/0079 |
| 9,296,404 B1 * | 3/2016 | Bell | .......................... | B62B 1/12 |

* cited by examiner

CONVERTIBLE CART ASSEMBLY

RELATED APPLICATION

The present application is a non-provisional patent application and claims priority benefit, with regard to all common subject matter, of earlier-filed U.S. provisional patent application titled "CONVERTIBLE CART/WHEELBARROW", Ser. No. 62/216,892, filed Sep. 10, 2015, incorporated by reference in its entirety into the present application.

BACKGROUND

Carts are often pulled by lawn tractors or other towing vehicles to haul dirt, leaves, mulch, rocks, yard waste, and other objects. But lawn tractors are sometimes too big or unwieldy to reach certain areas, so manually-pushed wheelbarrows are often used instead. But purchasing, maintaining and storing both a cart and a wheelbarrow is expensive and requires extra storage space.

SUMMARY

The present invention solves the above-described problems and provides a distinct advance in the art of hauling devices by providing a cart assembly that can be pulled behind a lawn tractor or other towing vehicle much like a conventional cart and quickly and easily converted to a wheelbarrow so that it can be manually pushed or pulled into areas not easily reachable by the lawn tractor.

One embodiment of the cart assembly broadly comprises a cart; a tow bar that may be attached between the cart and a towing vehicle so that the towing vehicle may pull the cart; and a wheelbarrow attachment accessory that may replace the tow bar to convert the cart to a manually-pushed wheelbarrow.

An embodiment of the cart comprises a frame; a pair of wheels rotatably coupled to the frame; a bed frame pivotally coupled to the frame and shiftable between a lowered, hauling position and a raised, dumping position; and a bed attached to the bed frame for receiving and hauling objects. The cart may further comprise a lift assist mechanism coupled between the frame and the bed frame for biasing the bed frame toward its raised, dumping position so as to assist a user in dumping objects from the bed.

An embodiment of the tow bar has a first end configured to attach to the frame of the cart and a second end configured to attach to a towing vehicle so that the towing vehicle may pull the cart. A mounting bracket attached to the first end of the tow bar permits the tow bar to pivot from side-to-side relative to the cart and a mounting bracket attached to the second end of the tow bar permits the tow bar to pivot from side-to-side relative to the towing vehicle.

An embodiment of the wheelbarrow attachment accessory comprises a draw bar; a mounting bracket attached to a first end of the draw bar that may be removably attached to the frame of the cart; a pair of handles attached to a second end of the draw bar that may be gripped by a user to move and maneuver the wheelbarrow; and at least one leg depending from the draw bar and handles for supporting the draw bar and handles above the ground.

The cart assembly may further comprise a latching assembly for latching the bed frame in its lowered, hauling position and releasing the bed frame so it and the bed can be raised to their raised, dumping position. An embodiment of the latching assembly comprises a keeper attached to the bed frame, a latch mounted on the tow bar, and a latch mounted on the wheelbarrow attachment accessory.

The latch on the wheelbarrow attachment accessory engages the keeper when the bed frame is in its lowered, hauling position and comprises a housing, a spring-biased latch bolt shiftable in and out of the housing between an extended, latched position for engaging the keeper and a retracted unlatched position for releasing the keeper. The latch further comprises a latch handle pivotally coupled with the rear of the latch bolt and shiftable between an upright position for shifting the latch bolt to its extended position and a downward position for shifting the latch bolt to its retracted position. A handle grip is formed on the distal end of the latch handle. The handle grip facilitates shifting of the latch handle and also serves to stabilize the cart assembly while dumping objects from the bed. A user may step on the handle grip while dumping objects from the wheelbarrow to prevent the legs of the wheelbarrow attachment accessory from lifting off the ground or sliding on the ground.

Mechanisms for converting carts to wheelbarrows exist, but they typically employ folding handles and the like that are too flimsy for heavy-duty use. In the present invention, the wheelbarrow attachment accessory replaces the tow bar when the cart assembly is to be used in the wheelbarrow mode and thus provides a sturdier configuration.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 9:
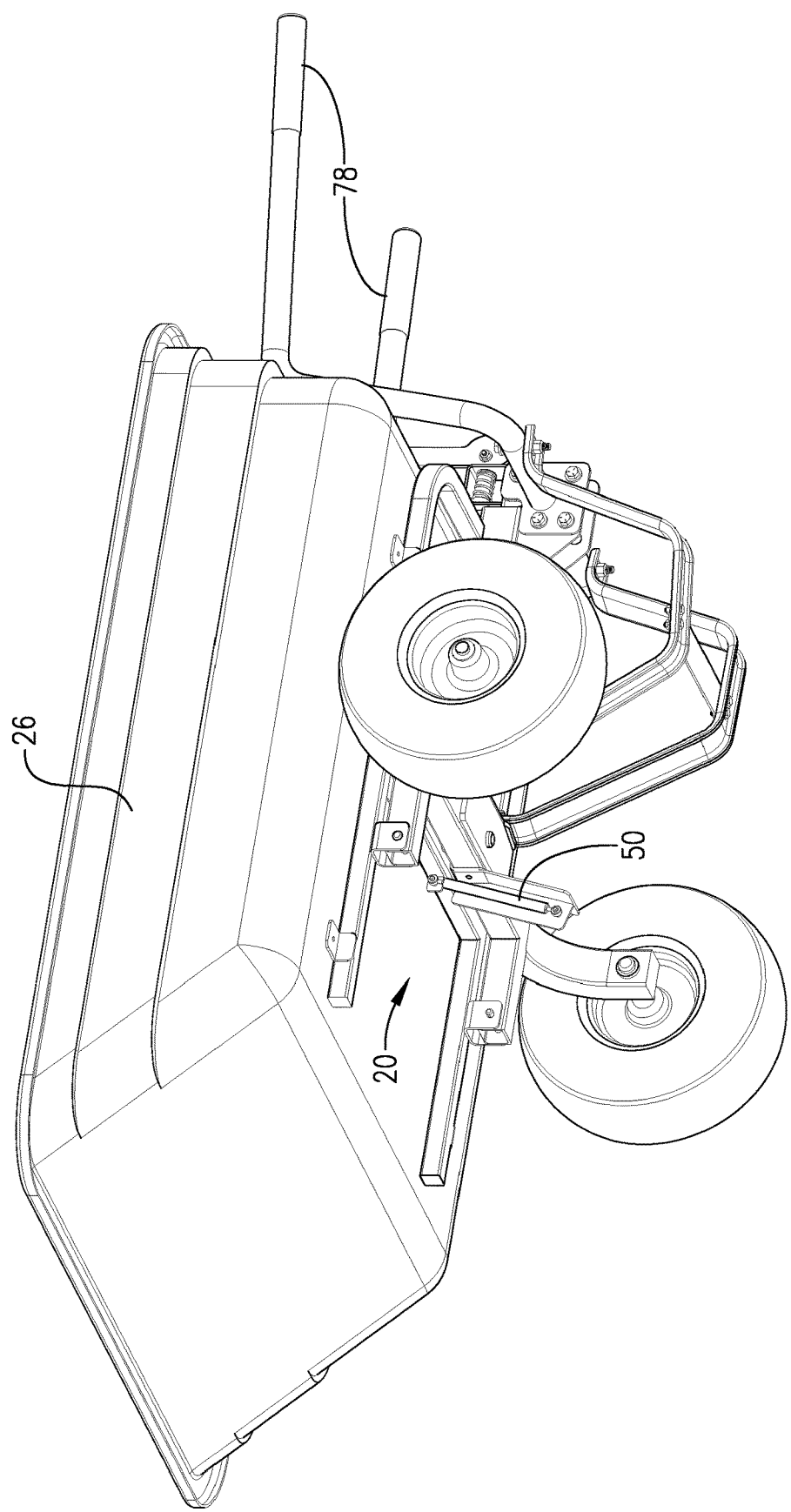

FIG. 9 is a bottom perspective view of the cart assembly showing its bed frame and bed in their lowered, hauling position, and its latch assembly in its latched position The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to the drawing figures, a cart assembly 10 constructed in accordance with various embodiments of the invention is illustrated. As described in more detail below, the cart assembly 10 can be converted for use in two different modes of operation: 1) a towing mode, shown in FIG. 1, in which the cart assembly 10 is pulled behind a lawn tractor 12 or other vehicle; and 2) a wheelbarrow mode, shown in FIGS. 4-9, in which the cart assembly 10 can be manually pushed or pulled much like a conventional wheelbarrow.

An embodiment of the cart assembly 10 broadly comprises a cart 14; a tow bar 16 that may be attached between the cart 14 and the towing vehicle 12 when the cart assembly is to be used in the towing mode; and a wheelbarrow attachment accessory 18 that may replace the tow bar when the cart assembly is to be used in the wheelbarrow mode. The components of the cart assembly 10 may be of any size and shape and constructed of any materials without departing from the scope of the invention.

Figure 2:
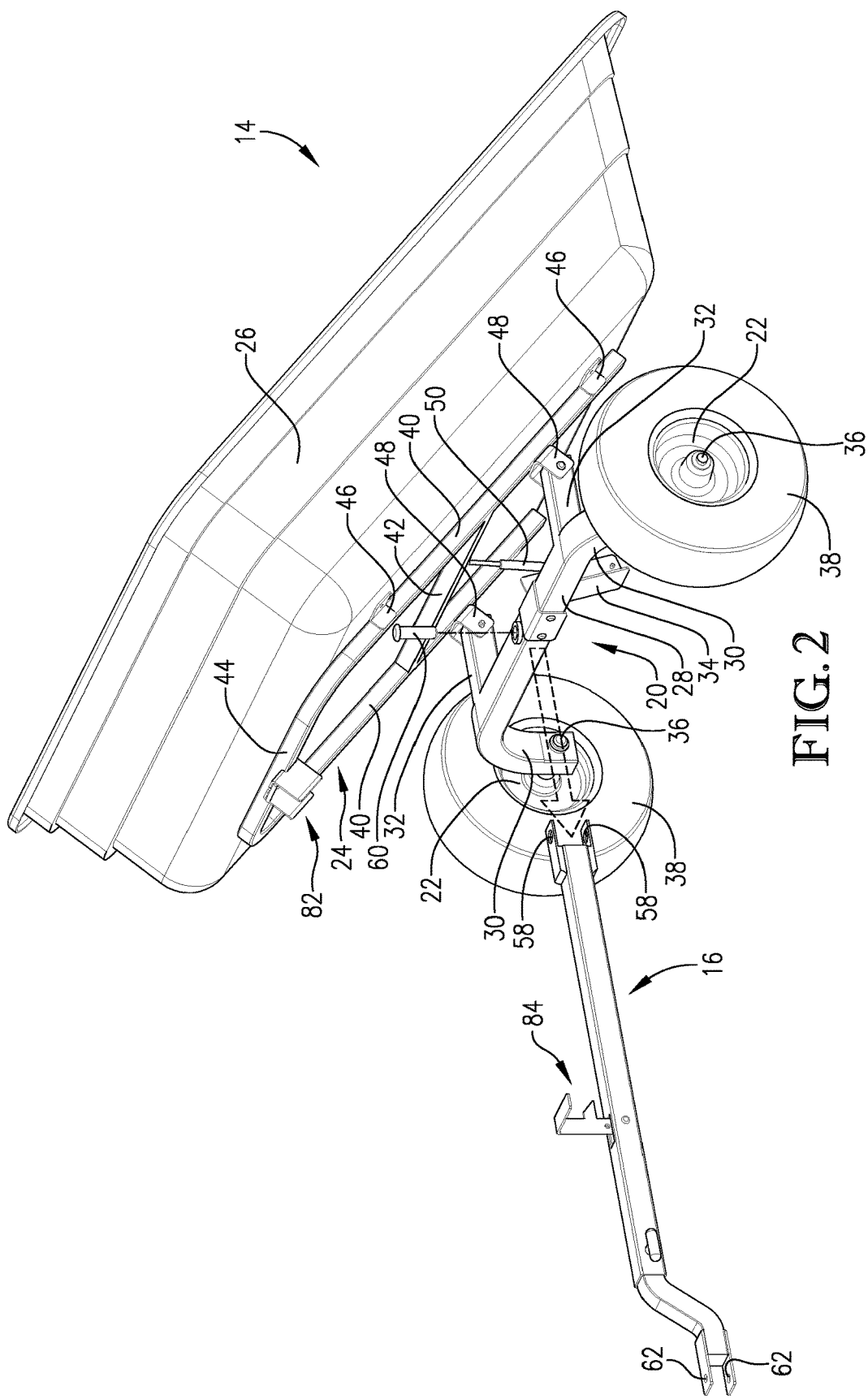
FIG. 2 is a front perspective view of the cart assembly with its bed frame and bed shown in their raised, dumping position and its tow bar being removed.

Referring to FIG. 2, an embodiment of the cart 14 broadly comprises a frame 20, a pair of wheels 22 rotatably coupled to the frame 20, a bed frame 24 pivotally coupled with the frame 20, and a bed 26 attached to the bed frame.

The frame 20 of the cart 14 includes a horizontally-extending crossbeam 28 and a pair of legs 20 depending from the ends of the crossbeam. The crossbeam 28 and legs 30 may be formed of a single piece of material that is bent to form the legs, or they may be formed as separate components and bolted, welded, or otherwise attached. In one embodiment, the crossbeam and legs are formed of 2" tubular steel, but they may be formed of other suitable materials.

An embodiment of the frame 20 also includes a pair of spaced-apart, rearwardly-extending posts 32 that serve as mounts for the bed frame 24 as discussed below. The posts 32 extend transversely from the crossbeam 28 and may be bolted, welded, or otherwise attached to the crossbeam. The frame may also include a mounting plate 34 attached to and extending below the crossbeam 28 that serves as a mount for a lift assist mechanism as discussed in more detail below.

The wheels 22 are conventional and are attached to the legs 30 by axles and bearing assemblies 36. Pneumatic or solid rubber tires 38 are supported on the wheels.

The bed frame 24 supports the bed 26 and connects it to the frame 20. An embodiment of the bed frame 24 includes a pair of side rails 40 bolted or otherwise attached below the sides of the bed 26, a transversely extending central rail 42 that interconnects the side rails below the central portion of the bed, and a transversely extending front rail 44 that interconnects the side rails below the front portion of the bed. The bed frame may be made of tubular steel or other suitable materials and may be bolted, screwed, or otherwise attached to the underside of bed with L-shaped brackets 46 or other fasteners.

An embodiment of the bed frame further includes a pair of U-shaped clamps 48 attached to the underside of the side rails 40 for connecting the bed frame 24 to the frame 20. The clamps 48 are attached to the posts 32 on the frame 20 by bolts or pins that extend through aligned, horizontally-extending holes in the clamps and posts. This mounting arrangement permits the bed frame and bed to pivot relative to the frame between a lowered, hauling position shown in FIGS. 1, 5, and 9 and a raised, dumping position shown in FIGS. 4 and 7.

The bed 26 is configured for hauling dirt, leaves, mulch, rocks, yard waste and other objects and is bolted or otherwise attached to the top of the bed frame 24 as discussed above. One embodiment of the bed 26 is tub-shaped with upstanding sidewalls, but it may also be flat or any other shape and size. The bed 26 is preferably formed of reinforced plastics or other synthetic resin materials, but it may also be made of aluminum, steel, or other materials.

The cart 14 may further comprise a gas strut, hydraulic cylinder, or other lift assist mechanism 50 coupled between the frame 20 and the bed frame 24 for biasing the bed frame 24 toward its raised, dumping position so as to assist a user in dumping objects from the bed 26. In one embodiment, one end of the lift assist mechanism 50 is attached to the mounting plate 34 on the frame 20 and the other end is coupled with the central rail 42 on the bed frame 24. This mounting arrangement applies a lifting force below a central portion of the bed 26 to evenly distribute the lifting force below the center of mass of the load carried in the bed.

Embodiments of the tow bar 16 and the wheelbarrow attachment accessory 18 will now be described in more detail. As mentioned above, the tow bar 16 and the wheelbarrow attachment accessory 18 may be interchangeably attached to the above-described cart 14 to convert it for either towing behind the towing vehicle 12 or for use as a wheelbarrow.

Referring again to FIG. 2, an embodiment of the tow bar 16 comprises an elongated, draw bar 52, a frame coupler 54 attached to a first end of the draw bar for connecting the tow bar to the frame, and a hitch coupler 56 attached to a second end of the draw bar for connecting the tow bar to a lawn tractor or other towing vehicle. The draw bar may be formed of any materials and may be of any desired length, and in one embodiment is approximately 36"-60" long and constructed of 2" tubular steel.

One embodiment of the frame coupler 54 is a U-shaped bracket with vertically spaced-apart plates 58 that fit over and under the cross member 28 of the frame 20. Vertically-aligned holes are formed in the plates 58 and the cross member 28 for receiving a mounting pin 60. The frame coupler 54 and mounting pin 60 allow the tow bar 16 to swivel from side-to-side relative to frame 20 to increase the maneuverability of the cart assembly 10.

One embodiment of the hitch coupler 56 is a U-shaped bracket with vertically spaced-apart plates 62 that engage a hitch or other mount on the towing vehicle 12. Vertically-aligned holes are formed in the plates 62 and the hitch for receiving a mounting pin. The hitch coupler and mounting pin allow the tow bar to swivel from side-to-side relative to the towing vehicle 12 to further increase the maneuverability of the cart assembly 10.

Figure 3:
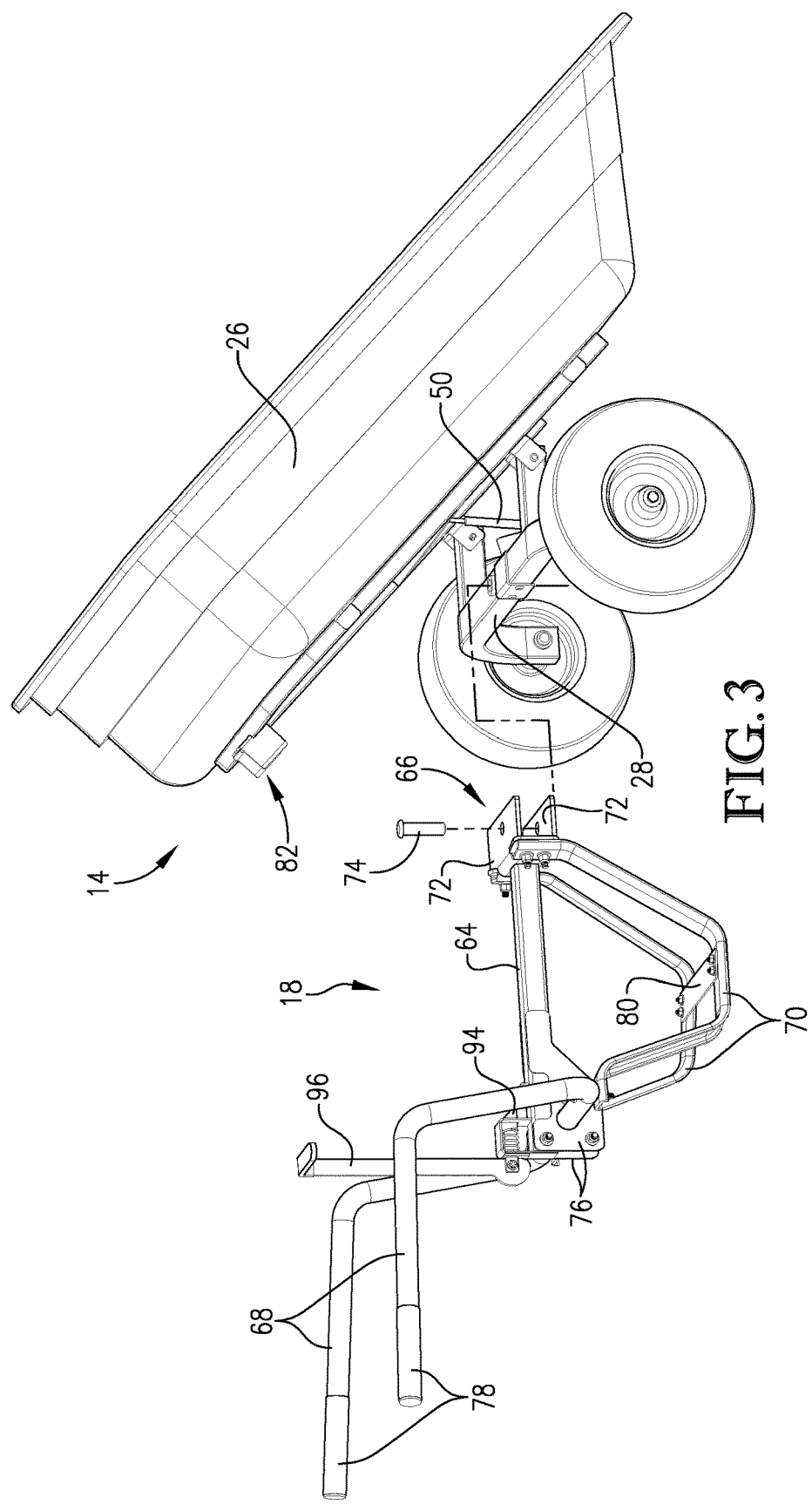
FIG. 3 is a front perspective view of the cart assembly with its bed frame and bed shown in their raised, dumping position and its wheelbarrow attachment accessory being attached.

Referring to FIG. 3, an embodiment of the wheelbarrow attachment accessory 18 comprises a draw bar 64; a frame coupler 60 attached to a first end of the draw bar 64 for connecting the wheelbarrow attachment accessory to the frame; a pair of handles 68; and a pair of legs 70. The components of the draw bar may be formed of tubular steel or any other suitable materials.

The draw bar 64 connects the handles 68 and legs 70 to the frame 20 of the cart 14 and may be any desired length and made of any suitable materials. In one embodiment, the draw bar is approximately 12"-48" long and constructed of 2" tubular steel.

An embodiment of the frame coupler 66 is a U-shaped bracket with vertically spaced-apart plates 72 that fit over and under the cross member 28 of the frame 20. Vertically-aligned holes are formed in the plates and the cross member for receiving a mounting pin 74. Locking bolts may be threaded through horizontally-extending holes in the frame coupler for locking the frame coupler against the cross member to prevent movement of the draw bar relative to the frame.

The handles 68 are attached to a second end of the draw bar 64 by a pair of mounting plates 76 that are bolted or otherwise attached to the draw bar. The handles 68 may be formed of several pieces of tubular steel that are interconnected with elbow joints or may each be formed of a single piece of steel or other material that is bent into the shape illustrated in the drawing figures. The ends of the handles may include grips 78 for assisting with gripping the handles.

The legs 70 depend form the draw bar 64 for supporting the draw bar and handles above the ground. In one embodiment, the legs are U-shaped and are connected between the frame coupler 66 and the handles. A brace 80 may interconnect the lower most sections of the legs to improve their rigidity and stability when engaging the ground.

The cart assembly 10 may further comprise a latching assembly for latching the bed frame 24 in its lowered, hauling position. An embodiment of the latching assembly comprises a keeper 82 attached to the bed frame 24, a latch 84 mounted on the tow bar 16, and a latch 86 mounted on and the wheelbarrow attachment accessory 18. The latches 84, 86 engage the keeper 82 when the bed frame 24 is in its lowered, hauling position.

Figure 4:
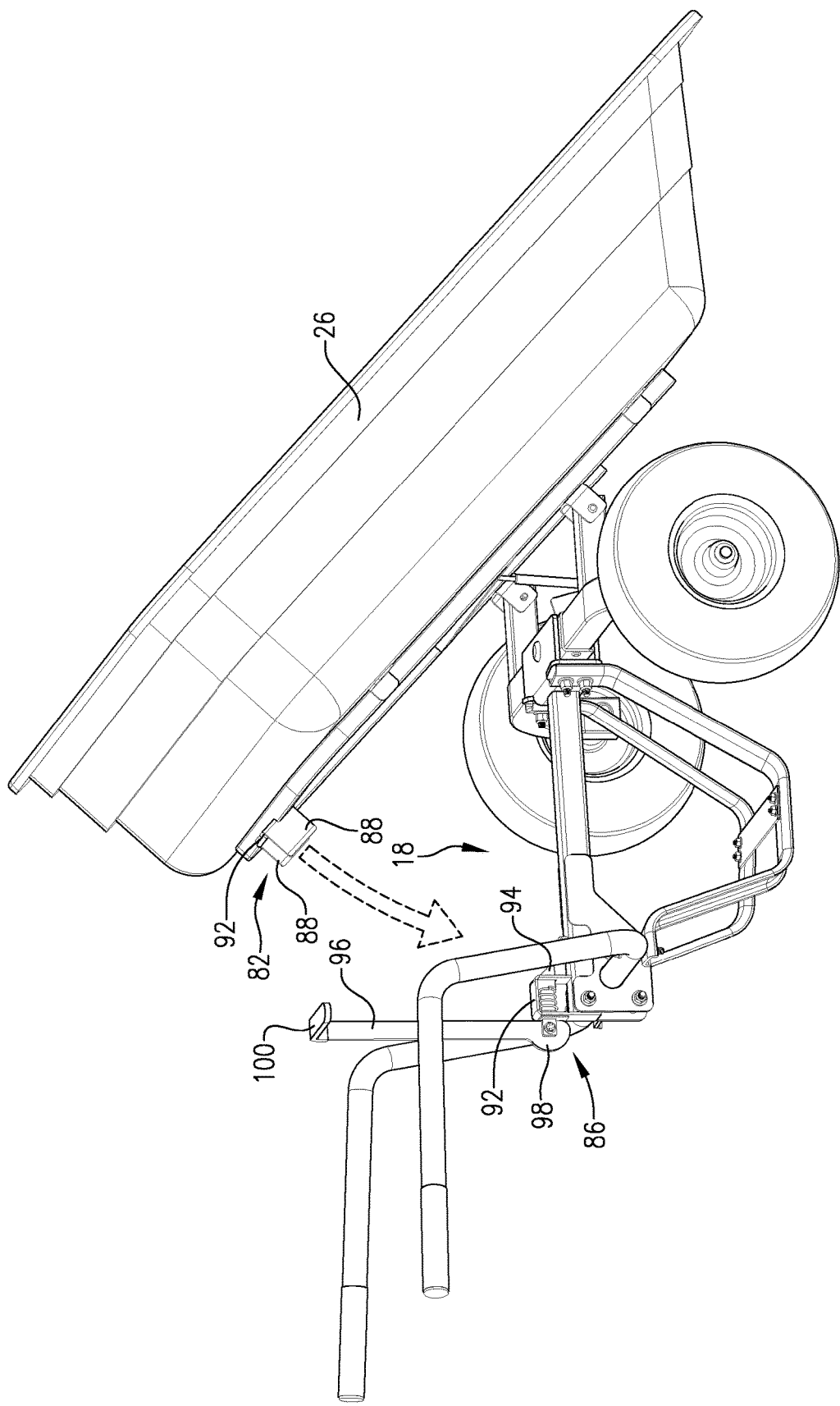
FIG. 4 is a front perspective view of the cart assembly with its bed frame and bed being shifted toward their lowered, hauling position.

Referring to FIG. 4, an embodiment of the keeper 82 comprises a U-shaped bracket with spaced-apart plates 88 that surround the tow bar 16 (when the cart assembly is used in the towing mode) or the draw bar of the wheelbarrow attachment accessory 18 (when the cart assembly is used in the wheelbarrow mode). The keeper 82 also includes a lip 90 that is held by one of the latches 84, 86 when the bed frame 24 is pivoted to its lowered, hauling position.

Figure 5:
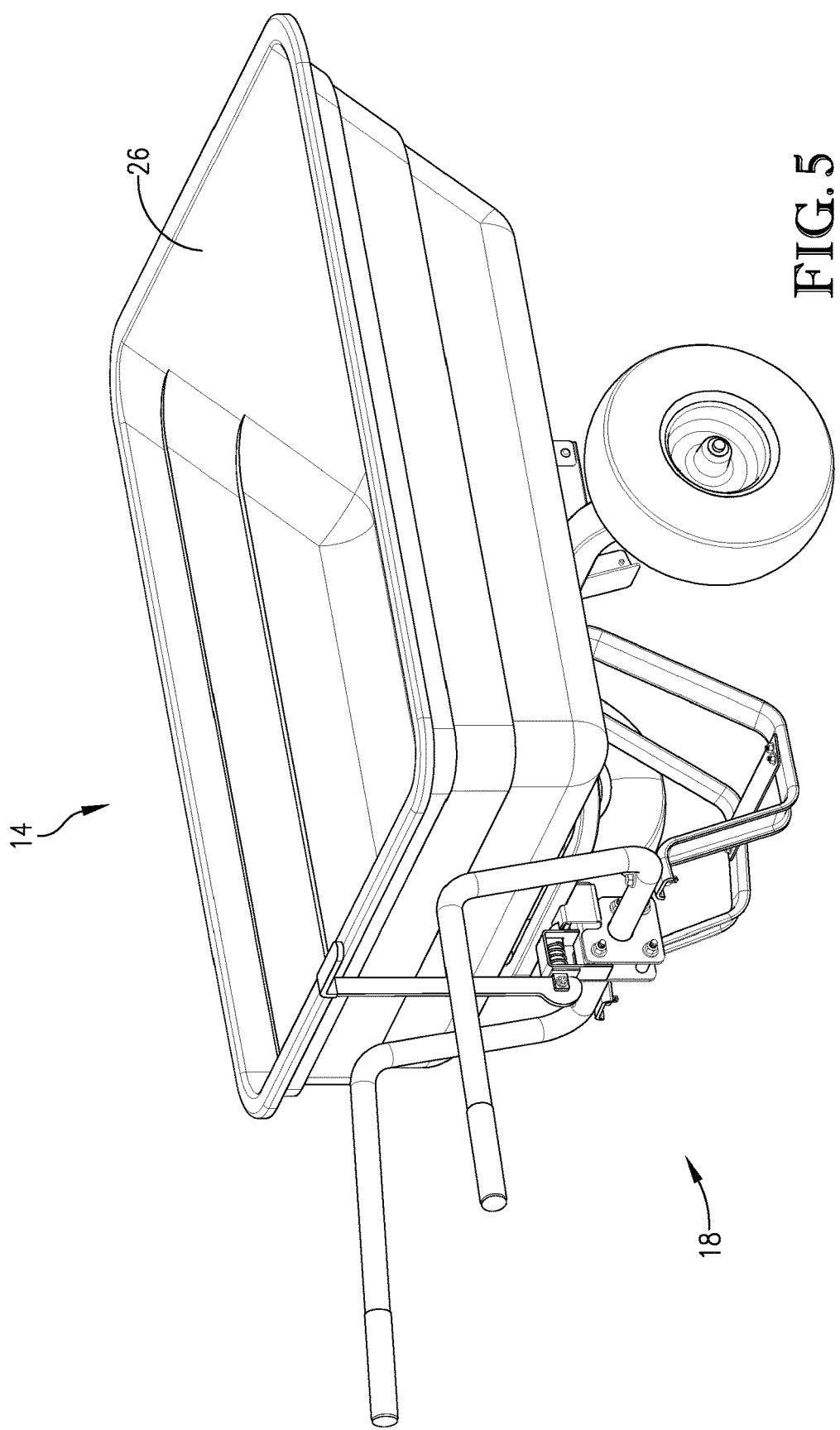
FIG. 5 is a front perspective view of the cart assembly with its bed frame and bed shown in their lowered, hauling position.
Figure 6:
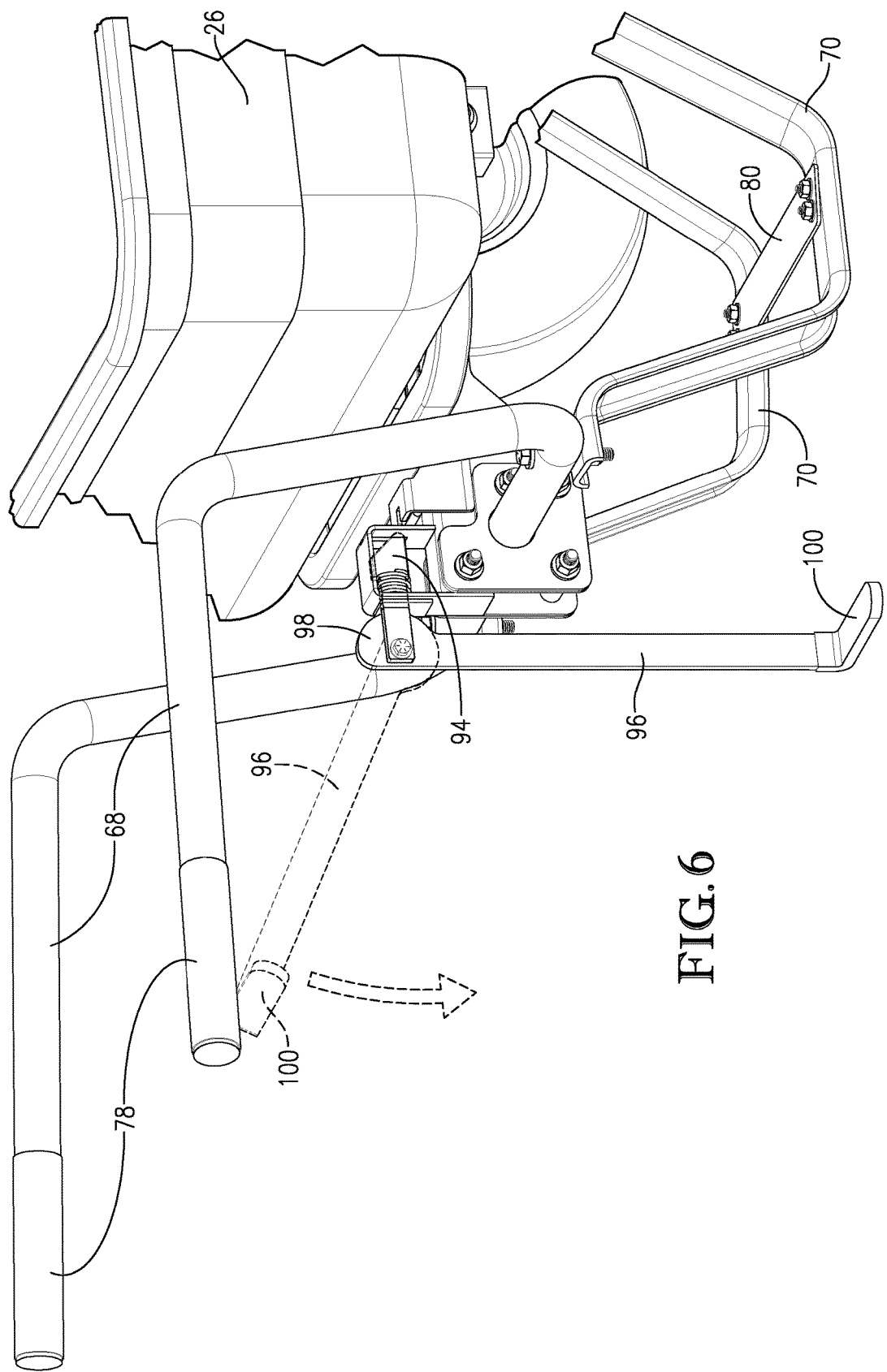
FIG. 6 is a partial perspective view of the cart assembly showing its latch assembly being shifted from its latched position to its unlatched position.
Figure 7:
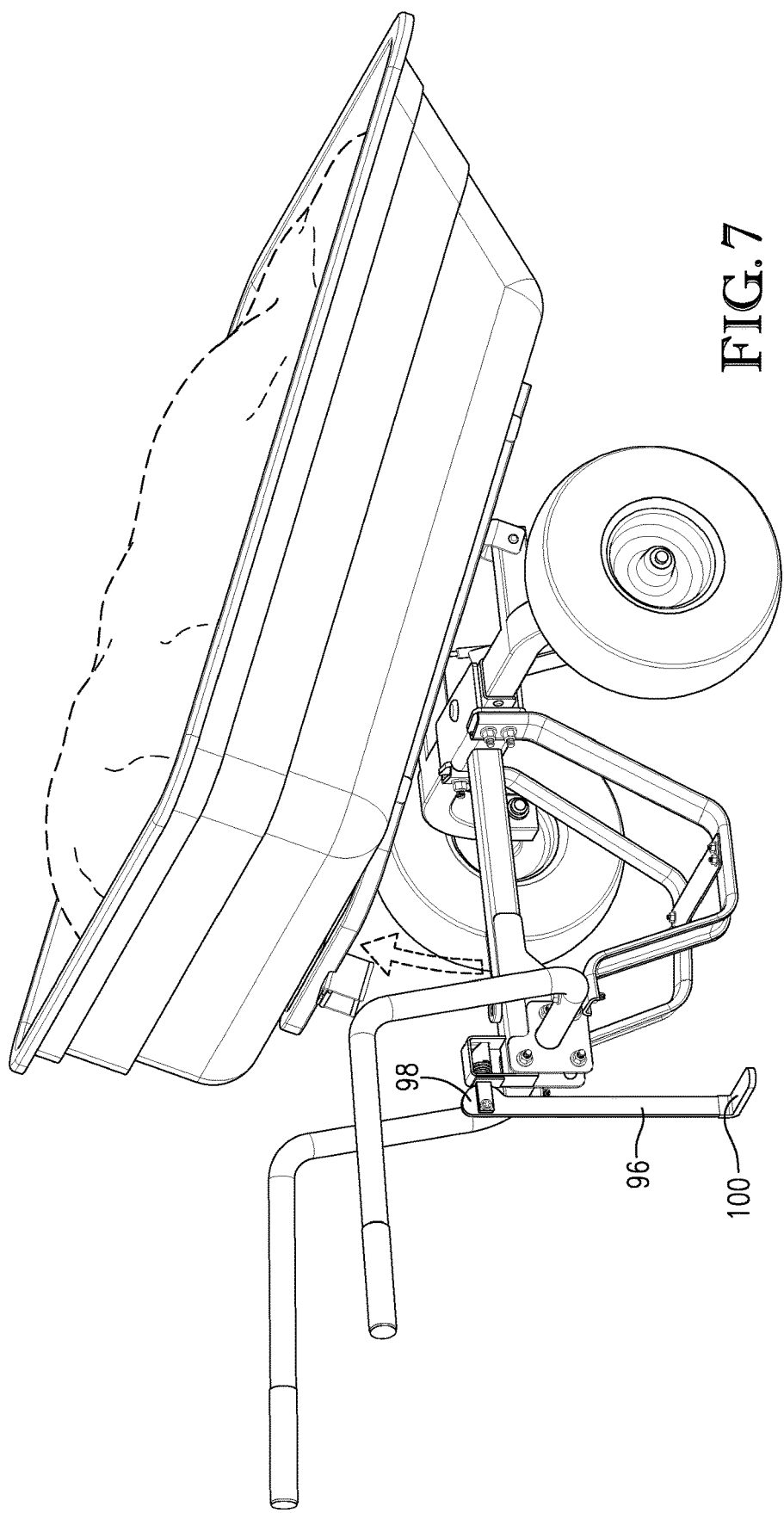
FIG. 7 is a perspective view of the cart assembly showing its bed frame and bed being shifted toward their raised, dumping position.
Figure 8:
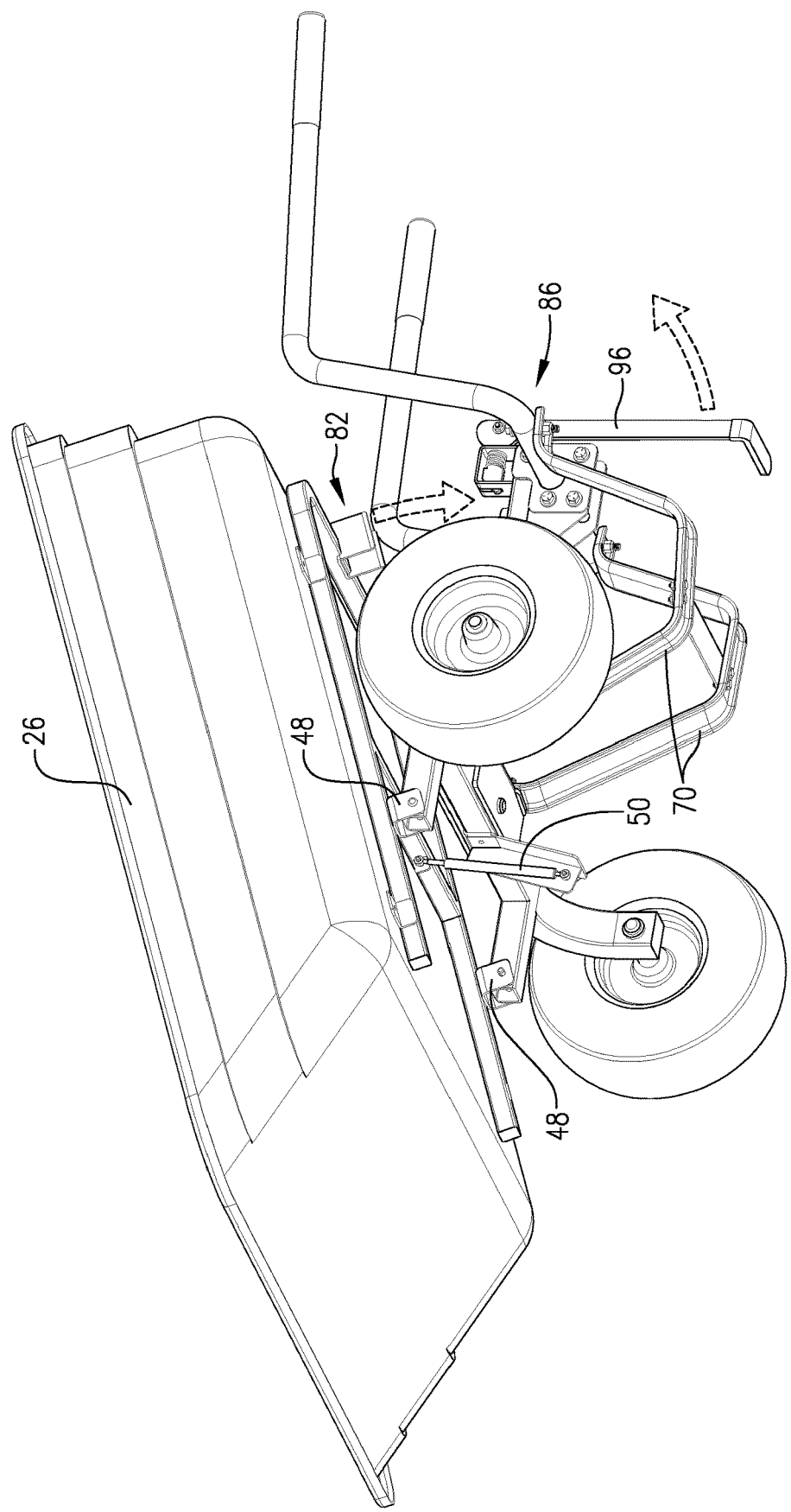
FIG. 8 is a perspective view of the cart assembly showing its bed frame and bed being shifted toward their lowered, hauling position, and its latch assembly being shifted back to its latched position.

Because the latches 84, 86 on the tow bar 16 and wheelbarrow attachment accessory 18 operate in a similar manner, only the latch 86 on the wheelbarrow attachment accessory will be described in detail. Referring again to FIG. 4, the latch 86 comprises a latch housing 92, a spring-biased latch bolt 94 shiftable in and out of the latch housing between an extended, latched position for engaging the keeper 82 and a retracted unlatched position for releasing the keeper. The latch 86 further comprises a latch handle 96 pivotally coupled with the rear end of the latch bolt 94 and shiftable between an upright position for shifting the latch bolt to its extended position and a downward position for shifting the latch bolt to its retracted position. An enlarged cam 98 is formed on the end of the handle that connects to the latch bolt. The cam 98 engages the latch housing 92 to retract the latch bolt when the handle is shifted downward as shown in FIGS. 6 and 7 and allows the bolt to extend under the influence of the spring to its latched position when the handle is lifted upward to its latched position as shown in FIGS. 5 and 9.

The opposite end of the latch handle 96 is bent 90 degrees to form a handle grip 100. The handle grip 100 also serves to stabilize the cart assembly when the latch handle 96 is shifted to its fully downward position as shown in FIG. 7. A user may step on the handle grip 100 while dumping objects from the wheelbarrow to prevent the legs of the wheelbarrow attachment accessory from lifting off the ground or sliding on the ground.

Figure 1:
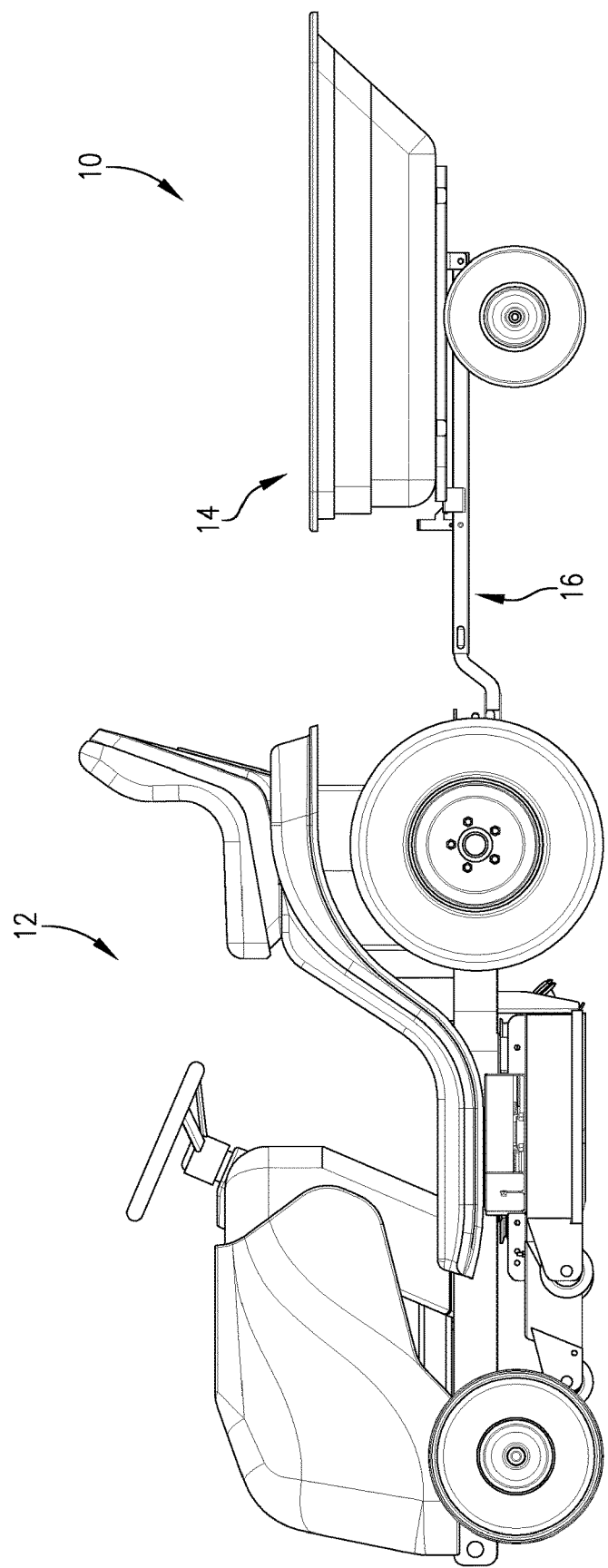
FIG. 1 is a side elevational view of a cart assembly constructed in accordance with an embodiment of the invention and shown being pulled by a lawn tractor.

Use of the cart assembly 10 will now be briefly described. To use the cart assembly in its towing mode, the tow bar 16 is attached to the cart frame 20 and to the lawn tractor as shown in FIG. 1. To convert the cart assembly to the wheelbarrow mode, the latch 84 is first operated to unlatch the bed frame 24 and allow the bed frame 24 and bed 26 to raise as shown in FIG. 2. This provides better access to cart frame 20 for removing the tow bar 16 and attaching the wheelbarrow attachment accessory 18. The tow bar 16 is then removed from the cart frame 20 by removing the attachment pin 60 and then pulling the tow bar from the cart frame 20 as shown in FIG. 2.

The tow bar 16 is then replaced with the wheelbarrow attachment accessory 18 by placing the mounting bracket 66 of the wheelbarrow attachment accessory 18 over the crossbeam 28 of the cart frame 28 and inserting the attachment pin 74 through the pin holes in the mounting bracket and the crossbeam as shown in FIGS. 3 and 4. Finally, the bed frame 24 and bed 26 are lowered until the keeper 82 on the bed frame is trapped by the latch 94 on the draw bar 64.

Once attached, the wheelbarrow attachment accessory 18 allows the cart assembly 10 to be manually pushed, pulled or otherwise moved much like a conventional wheelbarrow. Specifically, an operator may grip the handles 68, lift the legs 70 from the ground, and push or pull the cart to a desired location. To dump the cart bed 26, the operator shifts the latch handle 96 down as shown in FIG. 6 to retract the spring-loaded latch. The operator may then lift the bed 26 of the cart upwards as shown in FIG. 7 to dump objects from the bed. While doing so, the operator may step on the handle grip 100 of the latch handle 96 to stabilize the cart assembly as described above. The lift assist mechanism 50 applies upward pressure to the bed frame 24 to assist the operator in lifting the bed. An operator may also dump the wheelbarrow without disengaging the latch 94 and without using the lift assist mechanism 50 by simply lifting the handles 68 such that the bed frame 24, bed 26, and legs 70 lift upward to tip the front end of the bed.

Other details of the cart assembly 10 are disclosed in U.S. Pat. No. 8,998,341, entitled MULTI-FUNCTION DUMP CART, which is hereby incorporated by reference in its entirety. Although the invention has been described with reference to the particular embodiments, it is noted that equivalents may be employed and substitutions made herein without departing from the scope of the invention.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A cart assembly comprising:
  a frame;
  a pair of wheels rotatably coupled to the frame by at least one axle;
  a bed frame pivotally coupled to the frame so that the bed frame may be pivoted relative to the frame between a lowered, hauling position and a raised, dumping position;
  a bed attached to the bed frame;
  a removable tow bar having a first end that may be attached to the frame and a second end that may be attached to a towing vehicle so that the towing vehicle may pull the dump cart; and
  a wheelbarrow attachment accessory that may replace the removable tow bar to convert the dump cart to a wheelbarrow, the wheelbarrow attachment accessory comprising—
    a draw bar;
    a mounting bracket attached to a first end of the draw bar that may be removably attached to the frame;
    a pair of handles attached to a second end of the draw bar that may be gripped by a user to move and maneuver the wheelbarrow; and
    at least one leg depending from the draw bar for supporting the draw bar and handles above the ground.

2. The cart assembly as set forth in claim 1, further comprising a lift assist mechanism coupled between the frame and the bed frame for biasing the bed frame toward its raised, dumping position to assist a user in dumping objects from the bed.

3. The cart assembly as set forth in claim 1, further comprising a latching assembly for latching the bed frame in its lowered, hauling position.

4. The cart assembly as set forth in claim 3, the latching assembly comprising a keeper attached to and depending from the bed frame and a latch mounted on the draw bar of the wheelbarrow attachment accessory for engaging the keeper when the bed frame is in its lowered, hauling position.

5. The cart assembly as set forth in claim 4, the latch comprising a spring-biased latch bolt shiftable between an extended, latched position for engaging the keeper when the bed frame is in its lowered, hauling position and a retracted, unlatched position for releasing the keeper and permitting the bed frame to be lifted from its lowered, hauling position to its raised, dumping position.

6. The cart assembly as set forth in claim 5, the latch further comprising a latch handle coupled with the spring-biased latch bolt for shifting the latch bolt between its extended, latched position and its retracted, unlatched position.

7. The cart assembly as set forth in claim 6, the latch further comprising a latch housing attached to the draw bar for supporting and guiding the spring-biased latch bolt and the latch handle.

8. The cart assembly as set forth in claim 7, wherein the latch handle is pivotally mounted to the latch housing and shiftable between an upright position in which it shifts the latch bolt to its extended, latched position and a lowered position in which it shifts the latch bolt to its retracted, unlatched position.

9. The cart assembly as set forth in claim 4, the keeper comprising a U-shaped bracket with spaced-apart plates that collar the draw bar when the bed frame is pivoted to its lowered, hauling position and a lip that is held by the spring-biased latch bolt when the bed frame is in its lowered, hauling position and the latch bolt is in its latched position.

10. A cart assembly comprising:
  a frame;
  a pair of wheels rotatably coupled to the frame by at least one axle;
  a bed frame pivotally coupled to the frame so that the bed frame may be pivoted relative to the frame between a lowered, hauling position and a raised, dumping position;
  a bed attached on top of the bed frame for receiving and hauling objects;
  a lift assist mechanism coupled between the frame and the bed frame for biasing the bed frame toward its raised, dumping position;
  a removable tow bar having a first end that may be attached to the frame and a second end that may be attached to a towing vehicle so that the towing vehicle may pull the dump cart; and
  a wheelbarrow attachment accessory that may replace the removable tow bar to convert the dump cart to a wheelbarrow, the wheelbarrow attachment accessory comprising—
    a draw bar;
    a mounting bracket attached to a first end of the draw bar that may be removably attached to the frame;
    a pair of handles attached to a second end of the draw bar that may be gripped by a user to move and maneuver the wheelbarrow;
    a pair of U-shaped legs each having one end coupled with the draw bar, another end coupled with one of the handles, and an intermediate region for engaging a ground surface for supporting the draw bar and handles above the ground surface; and
    a latching assembly for latching the bed frame in its lowered, hauling position.

11. The cart assembly as set forth in claim 10, the latching assembly comprising a keeper attached to and depending from the bed frame and a latch mounted on the draw bar of the wheelbarrow attachment accessory for engaging the keeper when the bed frame is in its lowered, hauling position.

12. The cart assembly as set forth in claim 11, the latch comprising a spring-biased latch bolt shiftable between an extended, latched position for engaging the keeper when the bed frame is in its lowered, hauling position and a retracted, unlatched position for releasing the keeper and permitting the bed frame to be lifted from its lowered, hauling position to its raised, dumping position.

13. The cart assembly as set forth in claim 12, the latch further comprising a latch handle coupled with the spring-biased latch bolt for shifting the latch bolt between its extended, latched position and its retracted, unlatched position.

14. The cart assembly as set forth in claim 13, the latch further comprising a latch housing attached to the draw bar for supporting and guiding the spring-biased latch bolt and the latch handle.

15. The cart assembly as set forth in claim 13, wherein the latch handle is pivotally mounted to the latch housing and shiftable between an upright position in which it shifts the latch bolt to its extended, latched position and a lowered position in which it shifts the latch bolt to its retracted, unlatched position.

16. The cart assembly as set forth in claim 11, the keeper comprising a U-shaped bracket with spaced-apart plates that collar the draw bar when the bed frame is pivoted to its lowered, hauling position and a lip that is held by the spring-biased latch bolt when the bed frame is in its lowered, hauling position and the latch bolt is in its latched position.

17. A cart assembly comprising:
a frame;
a pair of wheels rotatably coupled to the frame by a pair of axles;
a bed frame pivotally coupled to the frame so that the bed frame may be pivoted relative to the frame between a lowered, hauling position and a raised, dumping position;
a bed attached to the bed frame for receiving and hauling objects;
a hydraulic lift assist mechanism coupled between the frame and the bed frame for biasing the bed frame toward its raised, dumping position;
a removable tow bar having a first end and a second end, the first end configured to be pivotally coupled with the frame such that the tow bar may pivot side-to-side relative to the frame, the second end configured to be attached to a towing vehicle so that the towing vehicle may pull the dump cart; and
a wheelbarrow attachment accessory that may replace the removable tow bar to convert the dump cart to a wheelbarrow, the wheelbarrow attachment accessory comprising—
a draw bar;
a mounting bracket attached to a first end of the draw bar that may be removably attached to the frame;
a pair of handles attached to a second end of the draw bar that may be gripped by a user to move and maneuver the wheelbarrow;
a pair of U-shaped legs each having one end coupled with the draw bar, another end coupled with one of the handles, and an intermediate region for engaging a ground surface for supporting the draw bar and handles above the ground surface; and
a latching assembly for latching the bed frame in its lowered, hauling position, latching assembly comprising a keeper depending from the bed frame and a latch mounted on the draw bar of the wheelbarrow attachment accessory for engaging the keeper when the bed frame is in its lowered, hauling position.

18. The cart assembly as set forth in claim 17, the latch comprising a spring-biased latch bolt shiftable between an extended, latched position for engaging the keeper when the bed frame is in its lowered, hauling position and a retracted, unlatched position for releasing the keeper and permitting the bed frame to be lifted from its lowered, hauling position to its raised, dumping position, the latch further comprising a latch handle coupled with the spring-biased latch bolt for shifting the latch bolt between its extended, latched position and its retracted, unlatched position, the latch further comprising a latch housing attached to the draw bar for supporting and guiding the spring-biased latch bolt and the latch handle.

19. The cart assembly as set forth in claim 18, wherein the latch handle is pivotally mounted to the latch housing and shiftable between an upright position in which it shifts the latch bolt to its extended, latched position and a lowered position in which it shifts the latch bolt to its retracted, unlatched position.

20. The cart assembly as set forth in claim 18, the keeper comprising a U-shaped bracket with spaced-apart plates that collar the draw bar when the bed frame is pivoted to its lowered, hauling position and a lip that is held by the spring-biased latch bolt when the bed frame is in its lowered, hauling position and the latch bolt is in its latched position.

* * * * *